United States Patent
Craft

(10) Patent No.: US 6,272,566 B1
(45) Date of Patent: Aug. 7, 2001

(54) SYSTEM FOR MAINTAINING PROPER BUFFERING WITHIN VIDEO PLAY LIST

(75) Inventor: David Jones Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/195,094

(22) Filed: Nov. 18, 1998

(51) Int. Cl.[7] .................................................. G06F 3/00
(52) U.S. Cl. ............................................. 710/53; 709/233
(58) Field of Search ................................... 709/231–235; 345/302, 526; 710/52–57

(56) References Cited

U.S. PATENT DOCUMENTS

| | | | |
|---|---|---|---|
| 5,159,447 | * 10/1992 | Haskell et al. | 358/133 |
| 5,541,955 | * 7/1996 | Jacobsmeyer | 375/222 |
| 5,630,067 | * 5/1997 | Kindell et al. | 395/200.09 |
| 5,907,363 | * 5/1999 | Botsford, III et al. | 348/419 |
| 5,913,031 | * 6/1999 | Blanchard | 395/200.34 |
| 6,091,776 | * 7/2000 | Linzer | 375/240 |

* cited by examiner

Primary Examiner—John A. Follansbee
(74) Attorney, Agent, or Firm—Volel Emile; Bracewell & Patterson L.L.P.

(57) ABSTRACT

Video assets are fetched from a data storage device and buffered based on the video rate associated with the video assets. The arrival deadline for each buffer is tracked. As the contents of a buffer are consumed by the video decoder, the buffering plan is computed. The intent of the buffering plan is to maintain enough buffering in prefetched buffers to cover a data storage device underflow. The proper amount of buffering to cover an underflow is computed by subtracting both the arrival deadline and buffer time of the next buffer to be consumed from the arrival deadline of subsequent future buffers. This computation must be performed for each future buffer until the difference is greater than or equal to the maximum storage device underflow period. If the difference is less than the storage device underflow period, then a fetch of the buffer from the data storage device must be performed. To rapidly build the buffering when the play list is first started or when device underflow substantially depletes the buffers, a higher priority I/O may be utilized.

18 Claims, 3 Drawing Sheets

SYSTEM FOR MAINTAINING PROPER BUFFERING WITHIN VIDEO PLAY LIST

BACKGROUND OF THE INVENTION

1. Technical Field

The present invention relates in general to video servers and in particular to buffering short clip video streams from video servers. Still more particularly, the present invention relates to buffering sufficient video assets during video streaming from a video server to prevent interruption of video streams due to data storage device underflow.

2. Description of the Related Art

Video servers are employed in a variety of contexts for providing streams of video information. (As used herein, the terms "video information" or "video assets" are intended to encompass video, including motion, stop-motion, or frame video, and combined video/audio information). The most common utilization is for broadcasting, either over conventional electromagnetic transmission or cable. Video assets of up to 10–15 hours are stored for streaming to the broadcast device. Video servers are also beginning to be widely employed for "Web-casting," transmission of video information over the Internet utilizing the World Wide Web format.

In video server systems, due to the nature of the underlying hardware and the real time response requirements of video streaming, it is necessary to maintain an adequate amount of video assets in short term memory buffers. Video data often originates from devices such as disk drives whose short term supply of data may fluctuate below the threshold necessary for proper streaming. For example, this can be caused by disk thermal recalibration or RAID (Redundant Array of Inexpensive Disks) data rebuild.

As a result of this data supply fluctuation, it is necessary to maintain data buffering equal to the real time streaming rate times the data storage device's maximum underflow time period. However, the device underflow time period may exceed the length of a single video clip. This easily happens with short video clips during failure of a RAID disk. In the short clip environment, it has been impossible or at least very expensive to maintain proper buffering to cover device underflow. Video streaming devices for the Internet or cable transmission typically have unique, specialized hardware solutions requiring a minimum video clip length to prevent underflow, and generally cannot handle subsecond video clips.

It would be desirable, therefore, to provide a method and apparatus for maintaining enough video data such that data storage device underflow would not result in underflow of the video decoder causing visible picture fluctuation.

SUMMARY OF THE INVENTION

It is therefore one object of the present invention to provide an improved video server.

It is another object of the present invention to provide a method and apparatus for buffering short clip video streams from video servers.

It is yet another object of the present invention to provide a method and apparatus for buffering sufficient video assets during video streaming from a video server to prevent interruption of short clip video streams due to data storage device underflow.

The foregoing objects are achieved as is now described. Video assets are fetched from a data storage device and buffered based on the video rate associated with the video assets. The arrival deadline for each buffer is tracked. As the contents of a buffer are consumed by the video decoder, the buffering plan is computed. The intent of the buffering plan is to maintain enough buffering in prefetched buffers to cover a data storage device underflow. The proper amount of buffering to cover an underflow is computed by subtracting both the arrival deadline and buffer time of the next buffer to be consumed from the arrival deadline of subsequent future buffers. This computation must be performed for each future buffer until the difference is greater than or equal to the maximum storage device underflow period. If the difference is less than the storage device underflow period, then a fetch of the buffer from the data storage device must be performed. To rapidly build the buffering when the play list is first started or when device underflow substantially depletes the buffers, a higher priority I/O may be utilized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
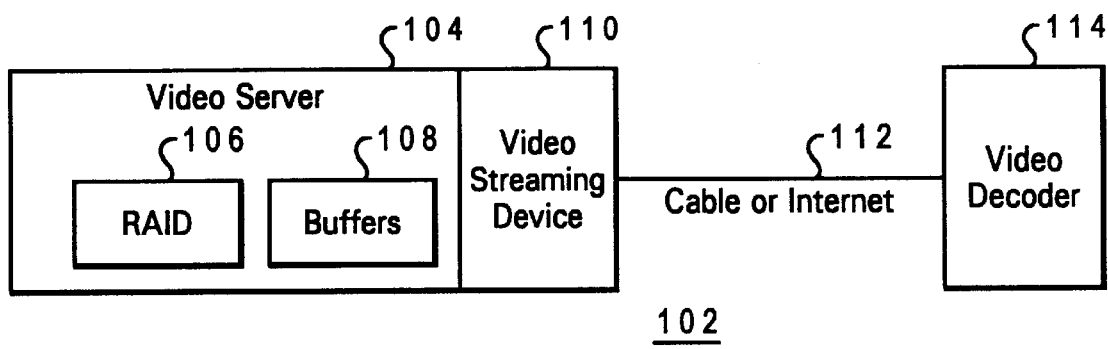
FIG. 1 depicts a block diagram of a video streaming environment in which a preferred embodiment of the present invention may be implemented.

With reference now to the figures, and in particular with reference to FIG. 1, a block diagram of a video streaming environment in which a preferred embodiment of the present invention may be implemented is depicted. Video streaming environment 102 includes a video server 104 including nonvolatile storage 106 such as a RAID device and memory buffers 108. Video assets are passed from nonvolatile storage 106 to buffers 108 in accordance with the present invention, as described in further detail below.

Video server 104 may include an integral video streaming device 110, or may be connected to a discrete video streaming device. Video streaming device 110 streams video assets from buffers 108 onto transmission media 112, which maybe a television cable or the Internet. The video assets are received by a device connected to transmission media 112 which includes video decoder 114. The device containing video decoder 114 may be a television, a personal computer, or any other suitable device.

Those skilled in the art will recognize that variations of the exemplary embodiment may be utilized to implement the present invention. The example depicted in FIG. 1 is not meant to imply architectural limitations to the present invention, and all such variations of the exemplary embodiment are believed to be within the spirit and scope of the present invention.

Figure 2:
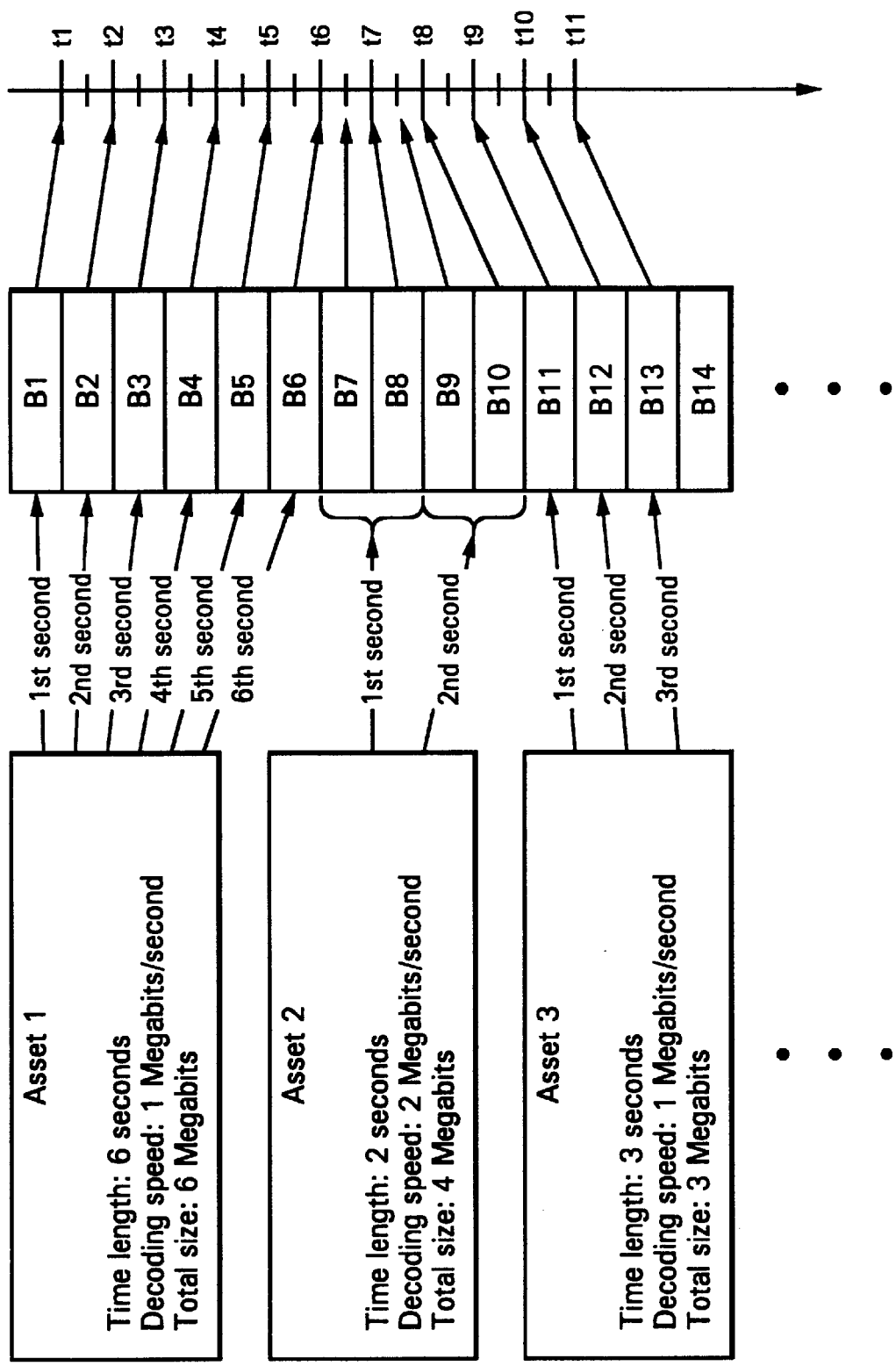
FIG. 2 is an example buffering plan and computation for a video asset play list in accordance with a preferred embodiment of the present invention.

Referring to FIG. 2, an example buffering plan and computation for a video asset play list in accordance with the preferred embodiment of the present invention is illustrated. A partial video asset play list is employed for the purposes of describing the invention. The assets are to be stored in data buffers within the video server having a uniform, predetermined arbitrary size, (1 megabit in the exemplary embodiment). The video assets employed may have different video rates, such as video assets conforming to the MPEG standard.

Three video assets are illustrated in FIG. 2. Asset 1 has an associated video rate (or decoding speed) such that 1 megabit (one data buffer full in the exemplary embodiment) of video information must be passed through to the video decoder every second. Asset 1 has a total of 6 megabits of video information, filling six data buffers, and provides 6 seconds of video assets. Asset 2 has an associated video rate such that two megabits of video information must be passed to the video decoder every second, with a total of four megabits of video information for 2 seconds of play time. Asset 3 must be streamed to the video decoder at a rate of 1 megabit per second and includes 3 megabits of information for 3 seconds of total video time.

Thirteen data buffers are indicated in FIG. 2 by buffer designation B1 through B13. A timeline of arrival deadlines t1 through t11 is also shown. In this context arrival deadlines are merely a future time at which a data buffer must pass into the video decoder in order for a human viewer to observe no aberrant picture fluctuation in the video output.

Arrival deadlines are computed relative to the arrival deadline of the first buffer (t1 in the exemplary embodiment). The arrival deadline of any given buffer is simply the arrival deadline of the preceding buffer plus the time required to consume that preceding buffer. This may be expressed as:

$$t(B_n)=t(B_{n-1})+K/s(B_{n-1})$$

where $t(B_n)$ is the arrival deadline for buffer $B_n$, $t(B_{n-1})$ is the arrival deadline for the buffer $B_{n-1}$ immediately preceding buffer $B_n$, K is the fixed size of the buffers, and $s(B_{n-1})$ is the streaming or decoding rate of the contents of buffer $B_{n-1}$. In the example shown, the contents of buffer B2 must arrive at a time t1 plus 1 second (1 megabit streamed at 1 megabit/second), or time t2.

In order to compute proper buffering to compensate for data storage device underflow, both the arrival deadline of the next buffer to be consumed and the amount of time it will take to consume the buffer, is subtracted from the arrival deadline of subsequent future buffers. If the difference is less than the maximum data storage device underflow period, then the buffer must be fetched from the data storage device.

For instance in the exemplary embodiment, if the next buffer to be consumed by the video decoder is buffer B1 and if the maximum data storage device underflow period is six seconds (determined through estimation or empirical measurement), then buffers B1 through B9 make up the buffering interval.

$$(t7.5-t1-1=5.5)<6$$

Buffer B10, however, is not currently part of the buffering interval since:

$$(t8-t1-1=6)\geq 6.$$

Obviously, any prefetching algorithm that hopes to maintain sufficient buffering to cover a single data storage underflow must build up sufficient buffering before consumption starts and must maintain the buffering during consumption of the buffered assets. In order to build up sufficient buffering before consumption starts, the buffering interval must be computed and buffers fetched within a minimum time. The minimum time to compute and prefetch buffers before the initial consumption starts is the maximum data storage device underflow period. Once consumption of the video buffers starts, it is sufficient to recompute the buffering interval and fetch needed buffers as each buffer is consumed.

Note that in the illustrated example, multiple assets are employed, of varying sizes and different video rates. Subsecond video assets may be employed, as shown by the data buffers containing one-half second video asset portions. The number of data buffers employed should contain sufficient video assets to cover the data device underflow period even if all data buffers contain video assets having the highest supported video rate. The buffer configuration employed may be circular, with buffers filled and consumed in round-robin fashion. The number of buffers provided should be based on the maximum video streaming rate. For instance, since Asset 2 has a decoding rate of 2 megabits/second, at least twelve one-megabit buffers should be provided to cover a six second device underflow at that video rate.

Figure 3:
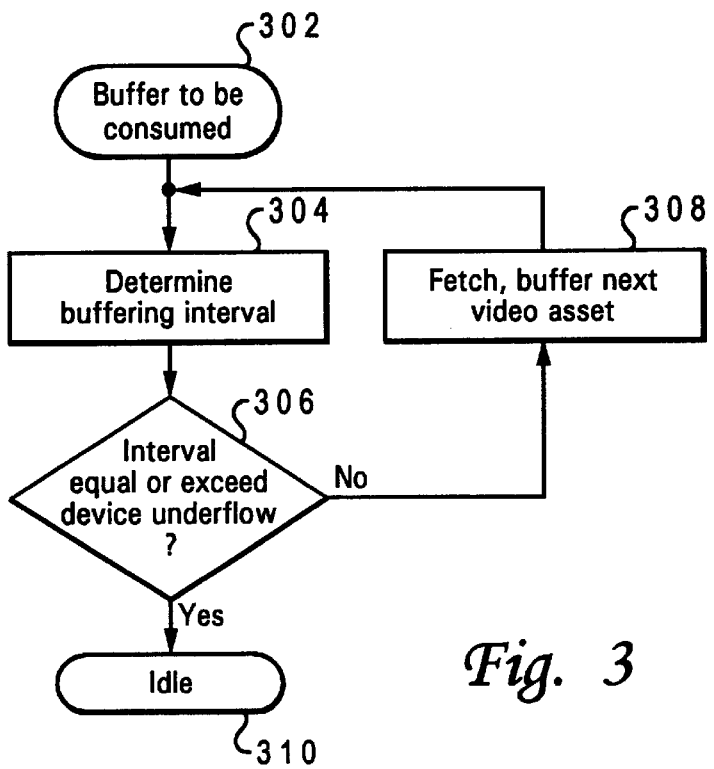
FIG. 3 depicts a high level flowchart for a basic process of buffering video assets for streaming by a video server in accordance with a preferred embodiment of the present invention.

With reference now to FIG. 3, a high level flowchart for a basic process of buffering video assets for streaming by a video server in accordance with a preferred embodiment of the present invention is depicted. The process begins at step 302, which illustrates the contents of a buffer about to be consumed for streaming by the video server. The process next passes to step 304, which depicts determining the buffering interval between the buffer to be consumed and a future buffer.

The process then passes to step 306, which illustrates a determination of whether the buffering interval exceeds the specified data device underflow period. If not, the process proceeds to step 308, which depicts fetching the next video asset in the play list and buffering it according to the buffer size and the video rate associated with the fetched video asset. All or only a portion of the next video asset within the play list may be fetched for buffering. The process then returns to step 304 for a determination of the new arrival deadline difference and whether that difference exceeds the specified underflow period.

Referring again to step 306, once the buffering interval exceeds the device underflow period, the process proceeds instead to step 310, which depicts the process becoming idle until the next data buffer is consumed for streaming. When the end of a play list is reached, the buffers are simply permitted to empty.

As each buffer is consumed, additional assets from the play list are fetched and buffered as necessary to cover the data device underflow period, thus preventing data underflow from impacting the video stream received by the video decoder. Computing the buffer interval between multiple assets allows the file system to build up and maintain proper buffering to cover the device underflow. The process depicted in FIG. 3, however, assumes an initial buffering build up sufficient to cover the device underflow is available when the contents of a data buffer are consumed. Additional strategies are desirable for achieving this initial buildup.

Figure 4:
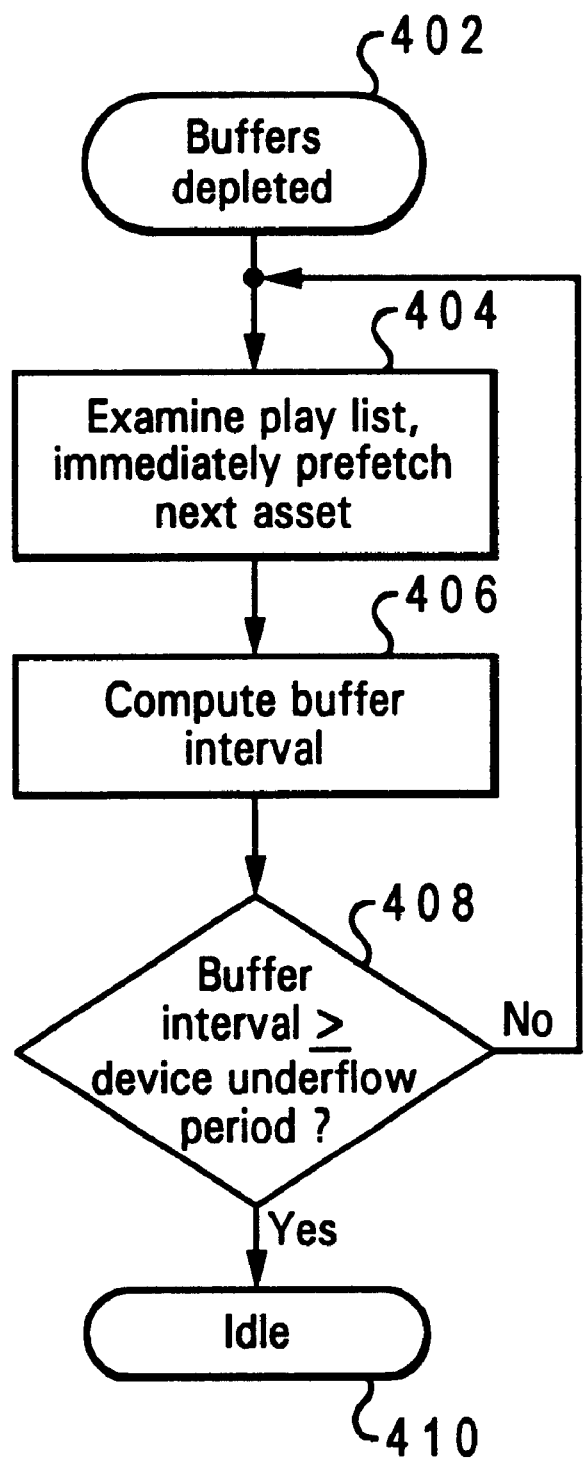
FIG. 4 is a high level flowchart for a process of initial buffering build up of video assets for streaming by a video server in accordance with a preferred embodiment of the present invention.

Referring now to FIG. 4, a high level flowchart for a process of initial buffering build up of video assets for streaming by a video server in accordance with a preferred embodiment of the present invention is illustrated. The process begins at step 402, which depicts the buffers being empty, or substantially depleted. This may occur, for example, when play of video assets specified within a play list is first initiated. It may also occur when the buffered assets are significantly depleted as a result of data device overflow.

The process next passes to step 404, which illustrates examining the play list and immediately prefetching video assets designated in the play list from the data device for buffering. This allows the initial build up to occur on a priority basis. Most conventional data storage and retrieval systems support only one class of I/O. However, the need for multiple classes of I/O in video servers has been recognized. Accordingly, many video servers have built support for multiple classes of I/O within the software. Some video server file systems, for instance, include a built in scheduling mechanism for different classes of I/O for real time and non-real time applications. Since the file system is responsible for writing to the underlying storage device, all of the I/O may be seen and ordered appropriately. Within this system, the video application must specify whether real time I/O is required, with all other I/O defaulting to the non-real time I/O category.

Within video servers of the type described, preference is normally given to non-real time I/O since non-real time applications usually benefit from quicker I/O response times. Real time applications, on the other hand, merely need the requested I/O on time, and derive no benefit from having the I/O complete early. The immediate prefetch non-real time I/O of the present invention, however, is given higher priority than normal non-real time I/O, and hence is issued to the device earlier. The immediate prefetch non-real time I/O thus achieves a faster response time than either normal non-real time or real time I/O, enabling quick initial buffer buildup. The immediate prefetch non-real time I/O guarantees that the buffered assets arrive far ahead of the normal real time deadline for such assets.

Once the first asset is fetched and buffered, the process next passes to step 406, which illustrates computing the buffer interval provided by the buffered asset, and then to step 408, which depicts a determination of whether the buffer interval is greater than the necessary buffering for the device underflow. If not, the process returns to step 404 for immediate prefetching and buffering of additional assets from the play list. If so, however, the process proceeds instead to step 410, which illustrates the process becoming idle until another play list is initiated or device data underflow substantially depletes the buffers.

The queuing and computation of the present invention may be implemented in the form of a programmatic interface to the file system which allows a single real time reservation to span multiple assets. The initial queue of a play list asset to the file system creates a new asset chain in the file system. The programmer specifies the stream rate for the asset being queued to the file system as well as the total amount of buffering time which will cover device underflow. The stream rate is allowed or disallowed depending on the streaming capabilities of the file system.

Upon return from the initial asset queue, the programmer is provided with a handle to reference this asset chain. When queuing subsequent assets in a video play list to the file system, the programmer refers to this handle. By queuing to the same asset chain, the individual real time streaming reservations are not cumulative, but are shared between all the assets on the chain. The asset chain shared reservation is merely the highest required reservation of any asset in the chain. Since assets in a video play list are sequentially accessed and since there is only one consumer of the data buffers, prefetch of single assets or across multiple assets utilizing the buffering interval computation never consumes more real time bandwidth than the shared rate.

The present invention combines video play list technology with real time streaming deadlines and producing a buffering plan through computation over multiple assets that encompass the device data underflow time. No special or unique hardware is required and subsecond video clips can be handled.

It is important to note that while the present invention has been described in the context of a fully functional data processing system network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of maintaining proper buffering within a video play list, comprising:

computing a buffer interval for buffers containing buffered video assets from the video play list;

determining whether the buffer interval equals or exceeds a device underflow period; and responsive to determining that the buffer interval does not equal or exceed the device underflow period, fetching additional video assets from the video play list for buffering so that the buffer interval equals or exceeds a device underflow.

2. The method of claim 1, wherein the step of computing a buffer interval for buffers containing buffered video assets from the video play list further comprises:

computing an arrival deadline for a last buffer containing buffered video assets.

3. The method of claim 2, wherein the step of computing an arrival deadline for a last buffer containing buffered video assets further comprises:

adding a buffer size divided by a streaming rate for a next-to-last buffer containing buffered video assets to an arrival deadline for the next-to-last last buffer containing buffered video assets.

4. The method of claim 1, wherein the step of determining whether the buffer interval equals or exceeds a device underflow period further comprises:

comparing the buffer interval to an estimated device underflow period for a storage device containing video assets for the video play list.

5. The method of claim 1, wherein the step of determining whether the buffer interval equals or exceeds a device underflow period further comprises:

subtracting an arrival deadline for a first buffer containing video assets, and the amount of time it will take to consume the buffer, from an arrival deadline to a last buffer containing video assets; and comparing the difference between arrival deadlines to an estimated device underflow period.

6. The method of claim 1, wherein the step of fetching additional video assets from the video play list for buffering further comprises:

fetching at least a portion of a next video asset in the video play list.

7. A system for maintaining proper buffering within a video play list, comprising:

means for computing a buffer interval for buffers containing buffered video assets from the video play list;

means for determining whether the buffer interval equals or exceeds a device underflow period; and means, responsive to determining that the buffer interval does not equal or exceed the device underflow period, for fetching additional video assets from the video play list for buffering so that the buffer interval equals or exceeds a device underflow.

8. The system of claim 7, wherein the means for computing a buffer interval for buffers containing buffered video assets from the video play list further comprises:

means for computing an arrival deadline for a last buffer containing buffered video assets.

9. The system of claim 8, wherein the means for computing an arrival deadline for a last buffer containing buffered video assets further comprises:

means for adding a buffer size divided by a streaming rate for a next-to-last buffer containing buffered video assets to an arrival deadline for the next-to-last last buffer containing buffered video assets.

10. The system of claim 7, wherein the means for determining whether the buffer interval equals or exceeds a device underflow period further comprises:

means for comparing the buffer interval to an estimated device underflow period for a storage device containing video assets for the video play list.

11. The system of claim 7, wherein the means for determining whether the buffer interval equals or exceeds a device underflow period further comprises:

means for subtracting an arrival deadline for a first buffer containing video assets, and the amount of time it will take to consume the buffer, from an arrival deadline for a last buffer containing video assets; and means for comparing the difference between arrival deadlines to an estimated device underflow period.

12. The system of claim 7, wherein the means for fetching additional video assets from the video play list for buffering further comprises:

means for fetching at least a portion of a next video asset in the video play list.

13. A computer program product within a computer usable medium, comprising:

instructions for computing a buffer interval for buffers containing buffered video assets from the video play list;

instructions for determining whether the buffer interval equals or exceeds a device underflow period; and instructions, responsive to determining that the buffer interval does not equal or exceed the device underflow period, for fetching additional video assets from the video play list for buffering so that the buffer interval equals or exceeds a device underflow.

14. The computer program product of claim 13, wherein the instructions for computing a buffer interval for buffers containing buffered video assets from the video play list further comprise:

instructions for computing an arrival deadline for a last buffer containing buffered video assets.

15. The computer program product of claim 14, wherein the instructions for computing an arrival deadline for a last buffer containing buffered video assets further comprises:

instructions for adding a buffer size divided by a streaming rate for a next-to-last buffer containing buffered video assets to an arrival deadline for the next-to-last last buffer containing buffered video assets.

16. The computer program product of claim 13, wherein the instructions for determining whether the buffer interval equals or exceeds a device underflow period further comprises:

instructions for comparing the buffer interval to an estimated device underflow period for a storage device containing video assets for the video play list.

17. The computer program product of claim 13, wherein the instructions for determining whether the buffer interval equals or exceeds a device underflow period further comprises:

instructions for subtracting an arrival deadline for a first buffer containing video assets, and the amount of time it will take to consume the buffer, from an arrival deadline for a last buffer containing video assets; and instructions for comparing the difference between arrival deadlines to an estimated device underflow period.

18. The computer program product of claim 13, wherein the instructions for fetching additional video assets from the video play list for buffering further comprises:

instructions for fetching at least a portion of a next video asset in the video play list.

* * * * *